(12) United States Patent
Kim et al.

(10) Patent No.: US 7,710,291 B2
(45) Date of Patent: May 4, 2010

(54) APPARATUS AND METHOD FOR GENERATING DRIVER ASSISTANCE INFORMATION OF TRAVELING VEHICLE

(75) Inventors: Kwang-Soo Kim, Seoul (KR); Se-Young Oh, Pohang-si (KR); Jin-Won Kim, Seoul (KR); Sang-Cheol Park, Seoul (KR); Sam-Yong Kim, Pohang-si (KR); Young-Woo Ryu, Jinhae-si (KR); Jeong-Gwan Kang, Pohang-si (KR)

(73) Assignees: Samsung Electronics Co., Ltd. (KR); Postech Academy Industry Foundation (KR)

( * ) Notice: Subject to any disclaimer, the term of this patent is extended or adjusted under 35 U.S.C. 154(b) by 290 days.

(21) Appl. No.: 11/774,253

(22) Filed: Jul. 6, 2007

(65) Prior Publication Data
US 2008/0055114 A1    Mar. 6, 2008

(30) Foreign Application Priority Data
Jul. 6, 2006  (KR)  ........................ 10-2006-0063649

(51) Int. Cl.
*G08G 1/123* (2006.01)
(52) U.S. Cl. ...................... 340/995.1; 340/435; 340/988
(58) Field of Classification Search ............. 340/995.1, 340/435, 436, 901, 903, 988, 465, 937; 701/41
See application file for complete search history.

(56) References Cited

U.S. PATENT DOCUMENTS 5,699,057 A * 12/1997 Ikeda et al. ................. 340/435
6,107,939 A * 8/2000 Sorden ....................... 340/988
6,191,704 B1   2/2001 Takenaga et al.
6,324,450 B1 * 11/2001 Iwama ........................ 701/45
6,388,565 B1 * 5/2002 Bernhard et al. ............ 340/435
6,882,287 B2 * 4/2005 Schofield .................... 340/903
7,355,524 B2 * 4/2008 Schofield .................... 340/903
7,403,219 B2 * 7/2008 Miyashita et al. ........... 340/903
7,409,279 B2 * 8/2008 Sugano et al. .............. 340/465
2002/0031242 A1   3/2002 Yasui et al.
2003/0025597 A1   2/2003 Schofield
2003/0154021 A1 * 8/2003 Delling et al. ........... 340/995.1
2004/0012488 A1   1/2004 Schofield

FOREIGN PATENT DOCUMENTS

EP           1 065 642        1/2001

* cited by examiner

*Primary Examiner*—John A Tweel, Jr.
(74) *Attorney, Agent, or Firm*—The Farrell Law Firm, LLP

(57) ABSTRACT

A method for generating driver assistance information of a traveling vehicle. The method can restructure traveling environments into an image based on a sensor system capable of removing blind spots around a traveling vehicle, and a scheme capable of exactly detecting a lane and a vehicle, and give a collision warning when there is a possibility of collision. Further, the method integrates recognition results of front/rear vehicles based on a lane recognition method applicable to various road environments, including the shape, curvature and loss of a lane, improves the stability of lane recognition, and distinguishes a solid line from a dot line, so it is possible to provide a driver with the subdivided degrees of danger. In addition, when a vehicle deviates from a lane, a voice warning may be output and the position of the vehicle for a road is restructured as an image.

12 Claims, 13 Drawing Sheets

APPARATUS AND METHOD FOR GENERATING DRIVER ASSISTANCE INFORMATION OF TRAVELING VEHICLE

PRIORITY

This application claims priority to an application filed in the Korean Intellectual Property Office on Jul. 6, 2006 and assigned Serial No. 2006-63649, the contents of which are incorporated herein by reference.

BACKGROUND OF THE INVENTION

1. Field of the Invention

The present invention generally relates to an apparatus and a method for generating driver assistance information of a traveling vehicle, and more particularly to an apparatus and a method for generating driver assistance information of a traveling vehicle so a driver can easily recognize the road conditions and the positions of adjacent vehicles in all directions of a traveling vehicle through lane recognition and vehicle detection.

2. Description of the Related Art

When a vehicle is traveling, rear-end accidents frequently occur due to careless driving, poor visibility, etc. That is, traffic accidents caused by lane deviation and rear-end accidents with a traveling vehicle can occur due to poor visibility, insufficient concentration of a driver, etc., in long distance driving, when it rains or in night driving. Such traffic accidents generally occur due to carelessness of a driver. If a driver can estimate such situations 2 to 3 seconds in advance and properly cope with the situations, such accidents can be reduced by more than 50% or may be minor accidents. In order to prevent such rear-ending, a driver assistance system has been provided, which can become aware of inter-vehicle position and speed through vehicle detection, and can provide information, such as an inter-vehicle collision warning, collision avoidance, cruise control, etc. Such a driver assistance system is capable of providing traveling information or a danger warning, and preventing safety accidents through active involvement so a driver can drive a vehicle more conveniently and safely. For such a driver assistance system, an assistance information generation system including a rear parking warning system, a lane deviation warning system, a drowsy driving warning system, etc., has been researched together with a lane deviation prevention system, an intelligent cruise control system, etc., which can perform active steering or speed control.

In order to extract lane or adjacent vehicle information, a conventional driver assistance system, as described above, has used various methods for detecting lanes in front from a camera, for detecting vehicles in front from a camera, for detecting vehicles in front by using radar, for detecting vehicles to the side/rear by using a camera installed at a side-mirror for rear monitoring, for detecting vehicles to the side by using a side ultrasonic sensor, etc. The extracted information about primary lanes and vehicles is used for generating valid information transmittable to a driver through various methods for estimating the relative position of a traveling vehicle and a lane, for estimating a lane deviation time point, for estimating a relative distance and a relative speed with an adjacent vehicle, and for estimating inter-vehicle collision by using the estimated information. Further, a warning sound, a warning lamp, vibration of a handle or a driver's seat, etc., has been used as an interface for reporting the extracted valid information to a driver. In addition to the means for reporting dangerous situations, a method for continuing to display traveling situations has used various methods for displaying the position and distance of a traveling vehicle and a vehicle in front on a straight road, for displaying vehicle information on road shape information extracted through sensor processing including a camera, radar and laser, for overlappingly displaying the position and distance information of a vehicle extracted through road information generated from a map database, etc.

A conventional driver assistance system, as described above, has required precise environment recognition and proper information transfer, but has mainly monitored only specific information about lane deviation or inter-vehicle collision situations in the front or side/rear of a vehicle, and has transferred only limited information to a driver. Therefore, such a system has inherent deficiencies due, for example, to possible obstructions in the vehicle. For environment recognition in all directions, a proper sensor arrangement is required to remove blind spots of a vehicle by using a minimum number of sensors, and front, rear, right/left side information must be exchanged and integrated instead of simply being combined. There are limitations in transferring synthetic information about all directions, such as front/rear/right/left lane criteria, corresponding vehicle criteria, distance, speed, collision or non-collision with adjacent vehicles, etc., to a driver mainly monitoring only front situations through a conventional simple interface.

Since the prior art displays traveling vehicle status and road conditions, and also extracts only the shape of a road through curvature information regardless of extracting road information, it is impossible to become aware of information about right/left side lanes. That is, conventional lane recognition technology, i.e. technology regarding lane recognition from images, extracts lane parts by using a brightness difference of a lane and a road, and computes the slope of the lane through inverse-perspective processing to calculate the curvature of the lane, or extracts lane parts through edge detection by a mask, and computes respective slopes in short and long distances to calculate the curvature of the lane. While a variety of distances may arbitrarily be considered as long and short distances, as used herein, a short distance is considered to be less than or equal to a preset distance, such as twenty meters or the like, and a long distance is considered to be greater than the preset distance. Further, the technology estimates the shape of the lane and the position of a vehicle for the lane through such lane recognition, and warns of lane deviation through a voice. However, since such a lane recognition method does not adaptively cope with changes in images or brightness of a lane, and thus does not easily extract a lane candidate, the entire performance of a lane recognition system may deteriorate, and significant time is required to perform inverse-perspective processing for images.

A road with a curvature is seen as a straight line with a constant slope and a curve with a small curvature in a short distance due to perspective effect, but it has a large curvature in a long distance. Further, in a long distance, lane candidates are insufficient based on lane criteria as compared to a short distance. Therefore, it is difficult to exactly estimate a curvature by estimating the entire curvature of a lane only with short distance information, or detecting lane candidates in a long distance by using a preset curvature value and computing a curvature by using this. In order to exactly estimate the curvature of a lane, it is necessary to provide a method capable of finding the exact position of a lane in a short distance, computing the curvature of a lane candidate located in a long distance, comparing this with the position of a short distance lane, and exactly finding a lane located in a long distance as well as a short distance.

When a vehicle moves onto a lane or a lane is worn or obscured due to antiquation of a road, it is necessary to provide a method capable of estimating a lane based on information about an obvious lane and lane width information. In addition, it is necessary to provide a process for stipulating a relation between a lane and a camera and thus exactly computing a position relation between the land and a vehicle, instead of lane detection. A lane deviation time point can be estimated based on the shape of a lane and a position relation between a lane and a vehicle. However, when the vehicle deviates from a central line, or moves toward a roadside, the possibility of safety accidents normally increases. On account of this, it is necessary to distinguish a dot lane from a solid lane, and noise elimination using integration of front/rear lane recognition is required for coping with a case where road conditions are different as with backlight or an intersection.

In the meantime, in order to generate road information by using a map database, a position measurement means should be precise, but is normally only available for roads for which map databases have been established. It is difficult to apply a position measurement means to a driver assistance system using position and direction information instead of an approximate position relation of a lane and a vehicle. Further, since conventional driver assistance systems monitor only the front of a traveling vehicle, it is difficult to overcome the limitations of such systems.

SUMMARY OF THE INVENTION

Accordingly, the present invention has been made to solve the above-mentioned problems occurring in the prior art, and the present invention provides an apparatus and a method for generating driver assistance information of a traveling vehicle so a driver can easily recognize environments about roads and adjacent vehicles in all directions of the traveling vehicle through lane recognition and vehicle detection.

The present invention also provides an apparatus and a method capable of exactly recognizing a straight or curved lane, a solid or dot lane, and exactly recognizing a lane even when the lane is not seen due to a traveling vehicle moving onto the lane or the wearing away of the lane.

In accordance with one aspect of the present invention, there is provided an apparatus for generating driver assistance information of a traveling vehicle, the apparatus including at least one image receiver installed on the traveling vehicle to photograph front/rear images, wherein the image receiver provides the photographed front/rear images; at least one ultrasonic signal receiver installed on the traveling vehicle, wherein the ultrasonic signal receiver emits ultrasonic signals, and computes distance information based on return time of the ultrasonic signals after being reflected from another vehicle; a lane recognizer for detecting a lane from the front/rear images, determining whether the detected lane is one of a solid line and a dot line, and synthesizing recognition results of front/rear vehicles to generate an image of a road; a vehicle recognizer for setting a road area as an area of interest by using the lane recognition results of the lane recognizer, detecting a vehicle by using an image and ultrasonic signals, detecting vehicles by using a distance obtained from the ultrasonic signals received from the ultrasonic signal receiver, determining a traveling tendency of a vehicle based on changes in the distance, and outputting a position of the vehicle in a vehicle coordinate system; and an environment restructuring unit for generating the driver assistance information by applying the vehicle detected by the vehicle recognizer to the image restructured by the lane recognizer.

In accordance with another aspect of the present invention, there is provided a method for generating driver assistance information by a traveling vehicle, the traveling vehicle including at least one image receiver installed on the traveling vehicle to photograph front/rear-images, the image receiver providing the photographed front/rear images, and at least one ultrasonic signal receiver installed on the traveling vehicle, the ultrasonic signal receiver emitting ultrasonic signals, and computing distance information based on return time of the ultrasonic signals after being reflected from another vehicle, the method including detecting a lane from the front/rear-images; determining whether the detected lane is one of a solid line and a dot line; synthesizing recognition results of front/rear vehicles to generate an image of a road; setting a road area as an area of interest by using the lane recognition results, and detecting a vehicle by using an image and ultrasonic signals; detecting vehicles by using a distance obtained from the ultrasonic signals received from the ultrasonic signal receiver, determining a traveling tendency of a vehicle based on changes in the distance, and outputting a position of the vehicle in a vehicle coordinate system; and generating the driver assistance information by applying the detected vehicle detected to the restructured image.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
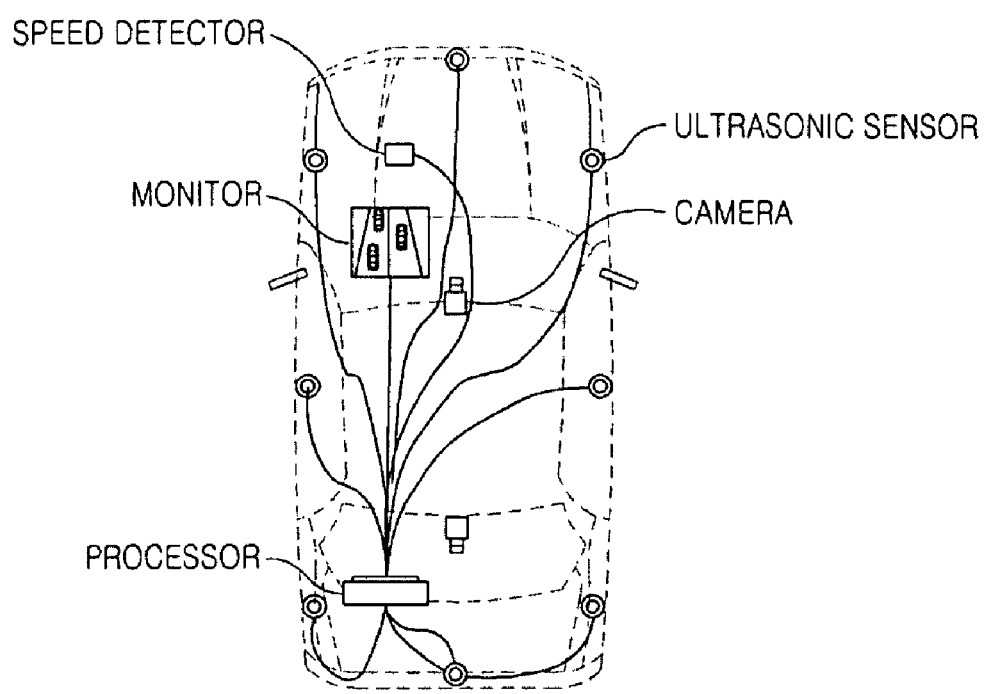
FIG. 1 is a diagram illustrating a vehicle having an ultrasonic sensor, a camera, and a speed detector according to the present invention.

Preferred embodiments of the present invention will be described below with reference to the accompanying drawings. It should be noted that similar components are designated by similar reference numerals although they are illustrated in different drawings. Also, in the following description, a detailed description of known functions and configurations incorporated herein will be omitted when it may obscure the subject matter of the present invention.

The present invention provides a method for forming a sensor system including a camera and an ultrasonic sensor for removing blind spots of a vehicle, removing the blind spots through front/rear-lane recognition, front/rear-vehicle detection, right/left-vehicle detection, and a combination of front/rear-vehicle information and right/left-vehicle information, and recognizing of environment in all directions, thereby generating a bird's eye image for watching generated road and vehicle information, and providing a warning function when danger of collision exists. Further, the present invention provides a method for simultaneously recognizing and synthesizing the lanes by using cameras installed on a vehicle when detecting lanes in order to draw the lanes in the bird's eye image, and drawing the lanes including solid and dot lanes in the bird's eye image, so a driver can easily determine whether the driver's vehicle has deviated from a lane.

An example of a traveling vehicle according to the present invention includes a driver assistance information generator having two cameras, eight ultrasonic sensors, one monitor, a speaker, a processor, and a speed detector, as shown in FIG. 1. The actual number of cameras, ultrasonic sensors, and monitors used may vary as desired.

Figure 2:
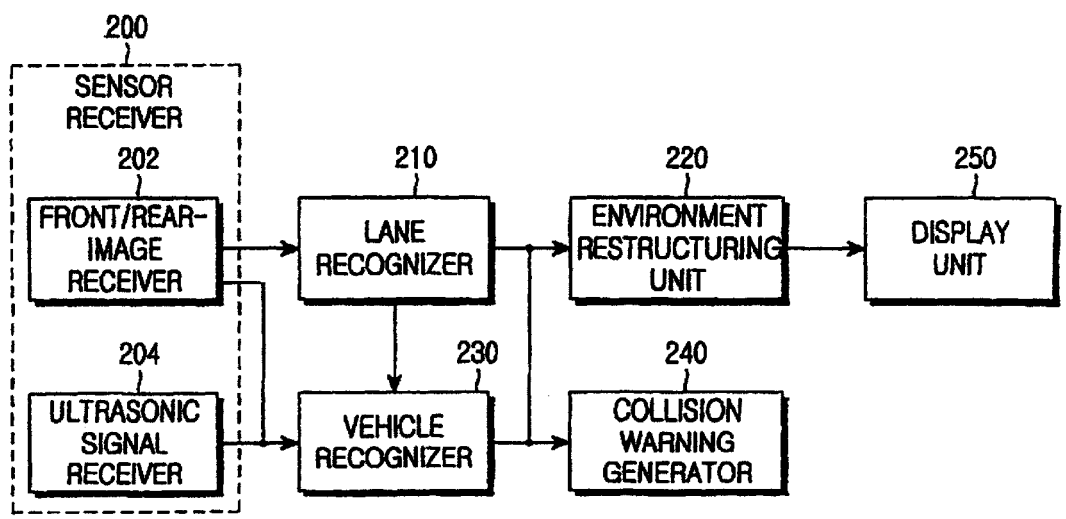
FIG. 2 is a block diagram of a driver assistance information generator of a traveling vehicle according to the present invention.

An operation by which the traveling vehicle with the driver assistance information generator generates driver assistance information will be described with reference to FIG. 2, which shows a driver assistance information generator according to the present invention. The driver assistance information generator includes a sensor receiver 200 having a front/rear-image receiver 202 and an ultrasonic signal receiver 204, a lane recognizer 210, a vehicle recognizer 230, an environment restructuring unit 220, and a collision warning generator 240. The front/rear-image receiver 202 receives images from the cameras and the ultrasonic sensors, and the ultrasonic signal receiver 204 receives ultrasonic signals. The lane recognizer 210 recognizes lanes about the traveling vehicle, and the vehicle recognizer 230 recognizes vehicles about the traveling vehicle and obstacles about the traveling vehicle. The environment restructuring unit 220 restructures roads and vehicles as an image, such as a three-dimensional (3D) bird's eye image, from the detected lanes and vehicles, and the collision warning generator 240 determines whether any collision has occurred among vehicles.

The sensor receiver 200 is a means for recognizing lanes around a vehicle, and for determining whether other vehicles exist around a traveling vehicle and includes the front/rear-image receiver 202 and the ultrasonic signal receiver 204, as described above. The front/rear-image receiver 202 denotes a camera, which photographs images of lanes and vehicles on a road, and provides the photographed images to the lane recognizer 210 and the vehicle recognizer 230. The front/rear-image receiver 202 obtains an image with a size of, for example, 320×240 from each camera installed about the traveling vehicle to photograph circumferential environments within an angle of about 45°. The ultrasonic signal receiver 204 denotes a sonar sensor (ultrasonic sensor), emits an ultrasonic signal within an ultrasonic range of about 10 m, and measures time until the emitted ultrasonic signal returns to the ultrasonic sensor. When another vehicle exists around the traveling vehicle, the ultrasonic signal receiver 204 can compute a distance with the other vehicle based on time when the emitted ultrasonic signal is reflected from the other vehicle and is then captured by the ultrasonic sensor. As shown in FIG. 1, the ultrasonic signal receiver 204 includes eight ultrasonic sensors installed at various locations about the traveling vehicle to measure distances with obstacles within a range of generally a maximum 10 m around the traveling vehicle, and continues to scan each of the ultrasonic sensors.

The lane recognizer 210 removes perspective effects of a lane candidate, which is detected from an image input from the front/rear-image receiver 202 through matching with patterns of black-white-black shown in paved roads and lanes, by using inverse-perspective transform, and regenerates a lane candidate. Then, the lane recognizer 210 estimates a direction of a lane by using a slope of the lane in a short distance, recognizes the lane by approximating curvature in a long distance, and outputs an equation of the lane in a vehicle coordinate system. As used herein, as previously mentioned, a short distance is considered to be less than or equal to a preset distance, such as twenty meters or the like, and a long distance is considered to be greater than the preset distance.

Figure 3:
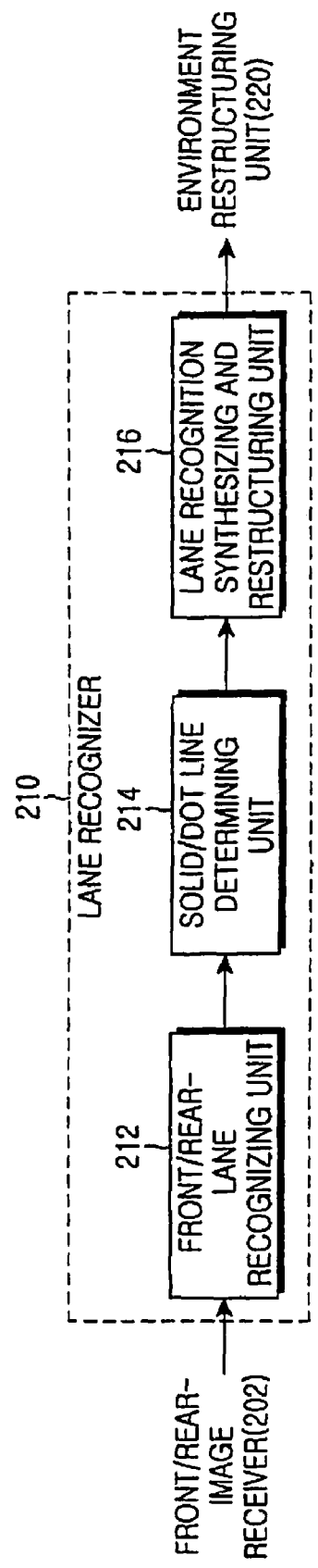
FIG. 3 is a block diagram of the lane recognizer in FIG. 2.

The lane recognizer 210 will be described with reference to FIG. 3. The lane recognizer 210 according to the present invention includes a front/rear-lane recognizing unit 212 for recognizing a lane from an image input from the front/rear-image receiver 202, a solid/dot line determining unit 214 for determining whether a detected lane is a solid lane or a dot lane, and a lane recognition synthesizing and restructuring unit 216 for synthesizing recognition results of front/rear-lanes, and restructuring the synthesis results as an image, such as a bird's eye image.

The vehicle recognizer 230 sets a road area as an area of interest by using the lane recognition results of the lane recognizer 210, and detects a vehicle by using an image and ultrasonic signals. The recognition of front/rear-vehicles can be implemented in the daytime and at night. In the daytime, the vehicle recognizer 230 detects a vehicle candidate by using a shadow pattern occurring between a vehicle and a road, and recognizes a vehicle by utilizing right/left edge components of the vehicle and preliminary knowledge about the width of the vehicle. At night, the vehicle recognizer 230 extracts and recognizes an image through the headlights and taillights of a vehicle. The vehicle recognizer 230 detects right/left-side vehicles by using a distance obtained from three ultrasonic sensors, determines the traveling tendency of a vehicle by using changes in the distance, and outputs the position of the vehicle in a vehicle coordinate system.

Figure 4A:
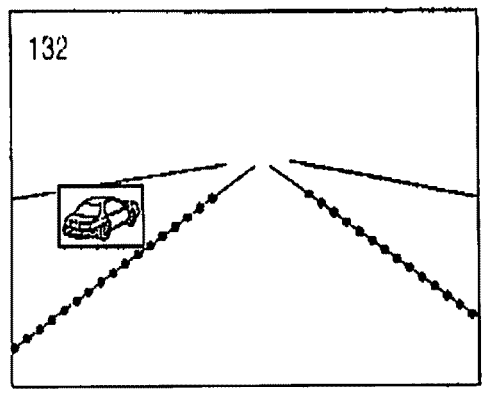
FIGS. 4A, 4B and 4C are diagrams illustrating driver assistance information of a traveling vehicle according to the present invention.
Figure 4B:
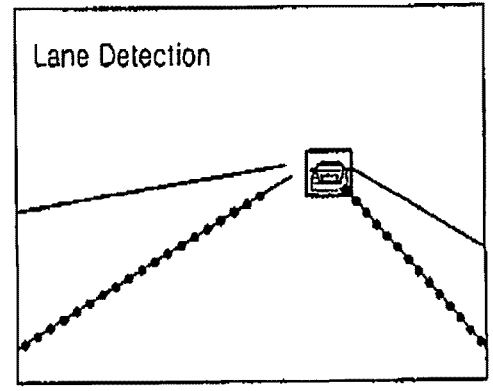
Figure 4C:
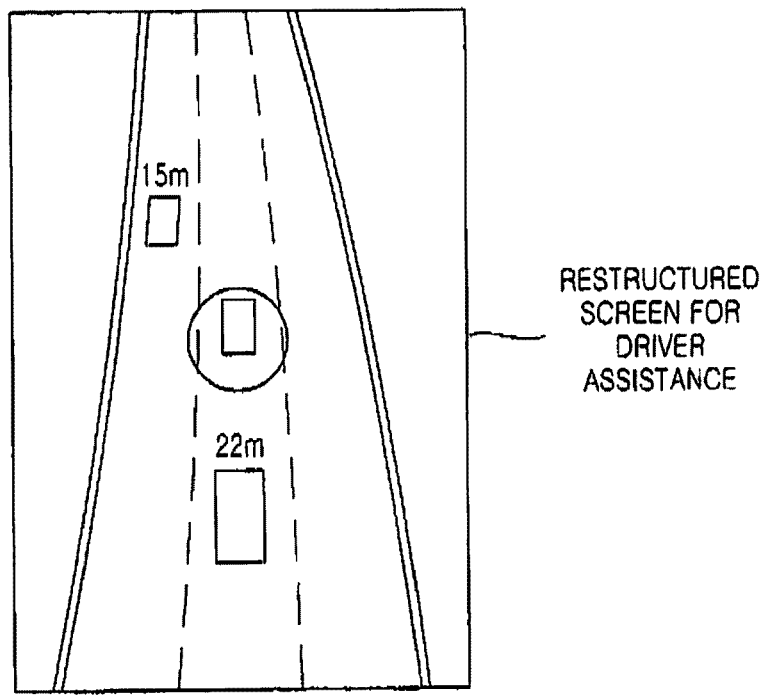

The environment restructuring unit 220 determines a solid line or a dot line of a lane by synthesizing a lane equation representing the lane and a position of a vehicle. When the lane is a solid line, the environment restructuring unit 220 regards the lane as the edge of a road to which lanes have not been added any more. When the lane is a dot line, the environment restructuring unit 220 adds one lane and then sets the number of lanes. In order to prevent a driver from being confused due to frequent changes in the curvature of a restructured road, the environment restructuring unit 220 generates a road model by quantizing the shape of the road according to the curvature variation of the road. Further, the environment restructuring unit 220 arranges vehicles on the lanes of the generated road, and forms an image, such as a 3D road image, in which a driver can easily adjust a field of vision. Then, the environment restructuring unit 220 causes the road image to be displayed on a screen through a display unit 250. The vehicles and road images formed through the environment restructuring unit 220 can be displayed on the screen, as shown in FIG. 4C. FIG. 4A shows an image photographed by a front camera, and FIG. 4B shows an image photographed by a rear camera.

The collision warning generator 240 estimates a Time To Collision (TTC) between vehicles by using the distance and relative speed of front/rear vehicles traveling in a lane of a traveling vehicle. After a collision time area is classified as a warning area and a danger area, a collision warning is generated.

In the present invention, a process will be described, by which the environment restructuring unit 220 of the driver assistance information generator restructures the lanes recognized by the lane recognizer 210, and the adjacent vehicles recognized by the vehicle recognizer 230 as an image, such as a bird's eye image, of a road. A process by which the driver assistance information generator performs lane recognition through the lane recognizer 210 will be described with reference to FIGS. 5 to 8C, and a process by which the driver assistance information generator obtains information (i.e. side-vehicle recognition and traveling information) about the adjacent vehicles recognized by the vehicle recognizer 230 will be described with reference to FIG. 9. Further, a process for restructuring the recognized lanes and vehicles to generate driver assistance information of a traveling vehicle will be described with reference to FIG. 11.

A process by which the lane recognizer 210 performs recognition of front/rear lanes of a traveling vehicle, and the environment restructuring unit 220 restructures a road will be described with reference to FIG. 5.

In step 500, the lane recognizer 210 receives front/rear-images from the front/rear-image receiver 202. In step 502, the lane recognizer 210 recognizes a lane from the received images. An operation for recognizing a lane from the images input from the front/rear-image receiver 202 through step 502 will be described with reference to FIG. 6. When the front or rear-images of a vehicle are input from the front/rear-image receiver 202 in step 600, the lane recognizer 210 extracts lane candidates according to changes in the brightness of the images in step 602. Then, the lane recognizer 210 generates a histogram of the extracted lane candidates in step 604, and determines the position of a lane adjacent to a traveling vehicle in step 606 Generally, the prior art computes the slope of a lane based on lane images. However, since the present invention determines only the position of a lane by using a histogram, the slope of the lane is not necessary. In step 608, the lane recognizer 210 computes the curvature of the lane candidates located in a long distance. The lane recognizer 210 may also compute the curvature of the lane candidates located in a short distance when desired. In step 610, the lane recognizer 210 recognizes a long distance lane by using the curvature computed in step 608. The prior art computes a curvature of the lane based on a slope of the lane, but the present invention actually computes a curvature to apply the computed curvature to lane recognition.

In step 504, the lane recognizer 210 determines whether the detected lane is a solid line or a dot line. In step 506, the lane recognizer 210 synthesizes the recognition results of front/rear-vehicles and restructures the synthesized results as an image, such as a bird's eye image. In step 508, the lane recognizer 210 displays the image restructured in step 506 on a screen.

Figure 7:
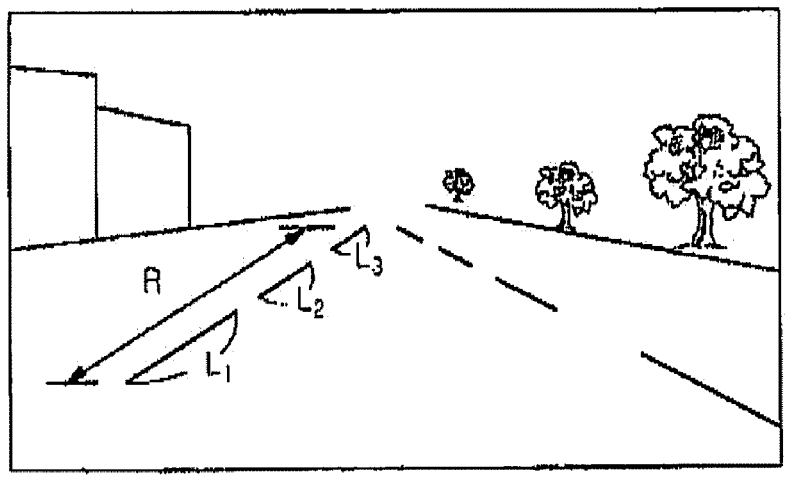
FIG. 7 is a screen illustrating a process for lane recognition according to the present invention.

An operation for determining whether the lane is a solid line or a dot line will now be described. The lane recognizer 210 determines a solid line and a dot line from an input image by using the fact that only bright parts consecutively appear for a solid line, but dark parts and bright parts periodically appear for a dot line. As shown in FIG. 7, an area in which a lane obtained through lane-searching results is located is indicated by R, an area in which a lane is actually drawn is indicated by $L_i$, and then the solid line or dot line of the obtained lane is determined by computing the ratio of the areas R and $L_i$. When the lane is drawn in the form of a dot line, dark parts and bright parts periodically appear in the area R. However, when the lane is drawn in the form of a solid line, only the bright parts consecutively appear in the area R. A ratio of the areas R and $L_i$ is calculated to determine a Solid Rate value, as shown in Equation (1).

$$SolidRate = \frac{\sum_{i}^{N} L_i}{R} \quad (1)$$

The lane is a solid line when the Solid Rate value is greater than a threshold. The lane is a dot line when the Solid Rate value is less than or equal to the threshold.

In this way, the solid line or the dot line of the lane is determined by using the brightness of the lane through Equation (1), so the type of a lane can be abnormally determined depending on road and adjacent brightness. On account of this, in the present invention, the type of a lane is determined based on a lane obtained from the front-image of the images input from the front/rear-image receiver 202, and the type of a lane is determined based on a lane obtained from the rear-image of the images input from the front/rear-image receiver 202. As a result of the determination, when the two types of the lane do not coincide with each other, the type of the lane is determined based on the three following criteria.

(1) When only the lane recognition for the front-image has succeeded, the type and curvature of the lane obtained from the front-image are applied to the rear-image.

(2) When only the lane recognition for the rear-image has succeeded, the type and curvature of the lane obtained from the rear-image are applied to the front-image.

(3) When the two types of the lane are different, an existing type of a lane is maintained as is.

When the recognized lane information does not consecutively coincide with the restructured type of a lane of a road for more than five frames, the type of a lane is modified in the restructuring of a road.

Then, the type of a lane is determined and a road is restructured. A process for restructuring a road will now be described. The present invention uses a road model. That is, a general road model is generated in advance, and the prepared road model is compared with a lane obtained through an input image. Then, a road model having a value most approximate to that of the lane obtained from the image is used for restructuring a lane.

As expressed by Equation (2) below, value "a" denoting the curvature of the lane obtained from the image is compared with elements of a lane curvature R=[−0.00125, −0.00115, . . . , 0.00115, 0.00125], which is a set of road models prepared in advance. Then, boundary values Bn1 and Bn2 belonging to the value "a" are determined, as expressed by Equation (3), the average of Bn1 and Bn2 is computed, and value "A" to be applied for restructuring a road is determined, as expressed by Equation (4).

In this way, even when lanes obtained in each frame are slightly different, values of the lane change within a range of the boundary values Bn1 and Bn2, modeling to a constant value is performed when a road is restructured.

$$f(y)=ax^2+bx+c \quad (2)$$

if $a>R(i-1)$ and $a<R(i)$ $$B_{n1}=R(i-1), B_{n2}=R(i) \quad (3)$$

$$A=(B_{n1}+B_{n2})/2 \quad (4)$$

In recognition through an image, the lanes of a road in a long distance may be distorted due to an error. Accordingly, when recognized results are reflected without changes, a curvature changes momentarily and considerably, and thus a road curved in a right direction may be suddenly altered into a road curved in a left direction, which results in unnatural alteration. That is, when a lane recognized in a current frame changes more than a threshold value due to an error or the rapid alteration of a road in a lane recognition process, as compared to a lane obtained in a previous frame, when this is reflected to a road model to restructure the road, the restructured road may change suddenly and considerably, which results in driver confusion. Accordingly, in the present invention, in order to prevent confusion from occurring, when variation of a recognized road exceeds a range of the boundary values Bn1 and Bn2 determined in a previous image, a neighbor model most approximate to the road model, having been used for the road restructuring, is used for subsequent road restructuring regardless of the variation as, expressed by Equation (5), so it is possible to minimize an error of road restructuring which may be caused by abnormal lane recognition. For example, when the value of a lane curvature R obtained from an image changes from −0.00125 to 0.00125, a lane curvature increasing step-by-step from −0.00125 to −0.00115, . . . ,0.00115 and 0.00125 is reflected for road restructuring, instead of restructuring another road with a rapid lane curvature.

if $(a<B_{n1})$ $$B_{n1}=R(i-2), B_{n2}=R(i-1)$$

else if $(a>B_{n2})$ $$B_{n1}=R(i), B_{n2}=R(i+1) \quad (5)$$

$$F_L(Y)=AX^2+0\cdot X-1.7$$

$$F_R(Y)=AX^2+0\cdot X+1.7 \quad (6)$$

if left lane is a dot lane $$F_{LL}(Y)=AX^2+0\cdot X-3.4$$

if right lane is a dot lane $$F_{RR}(Y)=AX^2+0\cdot X+3.4 \quad (7)$$

Figure 8A:
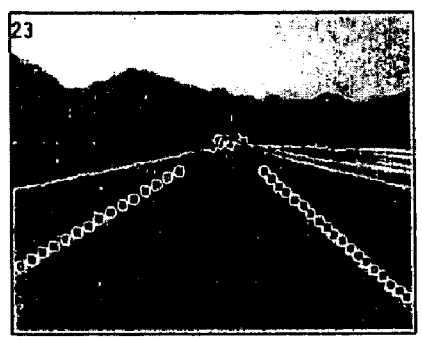
FIGS. 8A, 8B and 8C are screens obtained by restructuring lane recognition results according to the present invention.
Figure 8B:
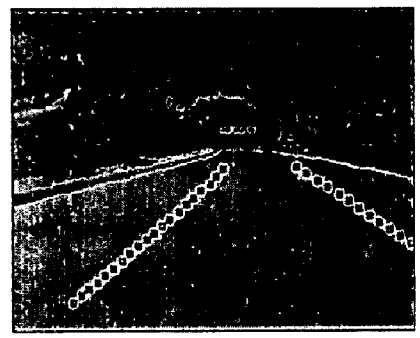
Figure 8C:
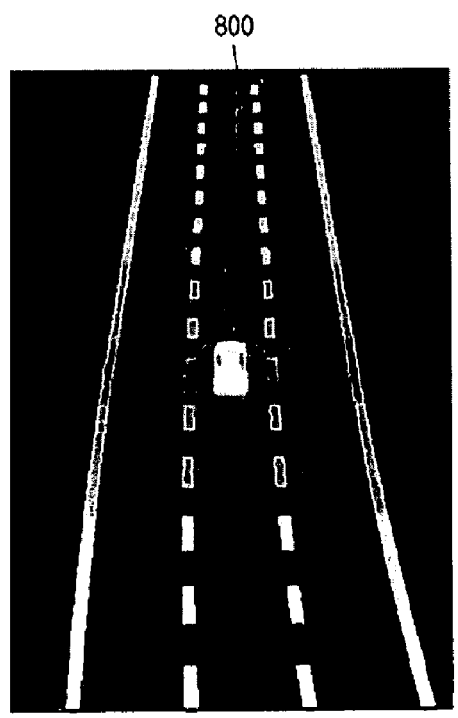

When parameter A to be used for road restructuring is determined through Equation (4) above, the right and left lanes to be used for the road restructuring are determined through Equation (6) above. When the lane to be used for the road restructuring is a dot lane, another lane exists adjacent to a lane along which a traveling vehicle is traveling. Accordingly, when FL(Y) in Equation (6) is a dot lane, FLL(Y) is additionally generated in the form of solid lane as expressed by Equation (7). Further, when FR(Y) in Equation (6) is a dot lane, FRR(Y) is additionally generated in the form of solid lane, as expressed by Equation (7), so a road can be restructured similarly to road environments in which the traveling vehicle is traveling. In this way, in the present invention, when a lane on one-side is unseen, it is possible to estimate the unseen lane by using information about a lane on the opposite-side. That is, in order to reduce driver obstruction factors caused by the rapid change of a road, gradual change to a neighbor model is implemented. The example in which the recognition results of front/rear-vehicles are restructured, as described above, may be shown in FIGS. 8A-C. FIG. 8A shows a front-image input from the front/rear-image receiver 202, and FIG. 8B shows a rear-image input from the front/rear-image receiver 202. The lane recognizer 210 detects lanes from the front-image and rear-image, as shown in FIGS. 5 and 6, and can display the restructured image, such as an image in the form of a 3D bird's eye view, based on the traveling vehicle 800.

A process for obtaining recognition and travel information about adjacent vehicles (side-vehicles) recognized through the vehicle recognizer 230, and a process for generating driver assistance information of a traveling vehicle by restructuring the recognized lanes and vehicles will be described with reference to FIG. 11. In the front/rear-vehicle detection method of the present invention, a road area is set as an area of interest by using the lane recognition results of the lane recognizer 210, and a vehicle is detected by using an image and ultrasonic signals. The recognition of front/rear-vehicles can be implemented in the daytime and at night. In the daytime, a vehicle candidate is detected by using a shadow pattern occurring between a vehicle and a road, and a vehicle is recognized by utilizing right/left edge components of the vehicle and preliminary knowledge about the width of the vehicle. At night, an image is extracted and recognized through the headlights and taillights of a vehicle. Further, right/left-side vehicles are detected by using a distance obtained from three ultrasonic sensors, and the traveling tendency of a vehicle is determined by using changes in the distance.

Figure 9:
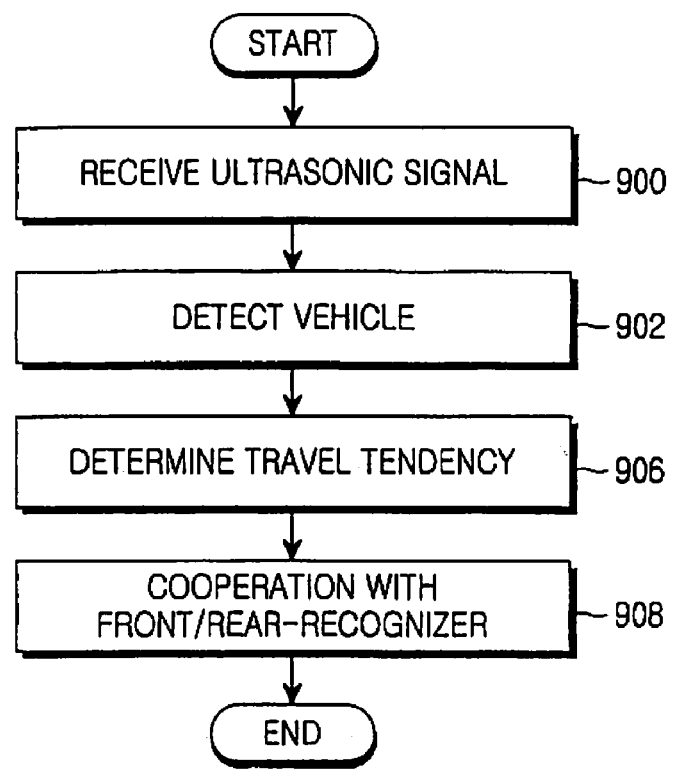
FIG. 9 is a flow diagram illustrating a process for side-vehicle recognition according to the present invention.
Figure 10:
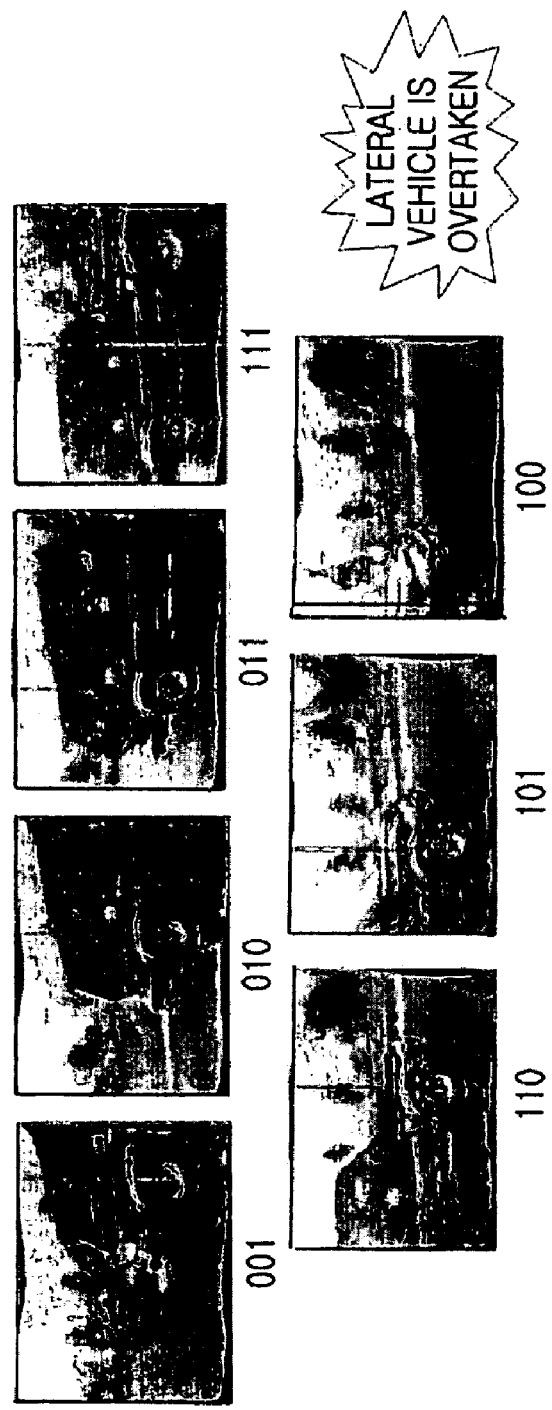
FIG. 10 is a screen illustrating a side-vehicle recognition process according to the present invention.

Referring to FIG. 9, in step 900, ultrasonic signals are received from three sonars, i.e. ultrasonic sensors, installed on the right side of the vehicle, and three ultrasonic sensors installed on the left side of the vehicle, as shown in FIG. 1. That is, the ultrasonic signal receiver 204 of FIG. 2 receives the ultrasonic signals. Then, the ultrasonic signal receiver 204 outputs the received ultrasonic signals to the vehicle recognizer 230. In step 902, the vehicle recognizer 230 detects a vehicle by using distance information obtained from the ultrasonic signals. When a vehicle is detected from one or more ultrasonic waves, the vehicle recognizer 230 determines the traveling tendency of a vehicle traveling in a side lane by judging whether ultrasonic waves have been detected according to the passage of time in step 906. The ultrasonic signals output from the three ultrasonic sensors installed at the side of the vehicle are expressed by a bitstream including 0 and 1, as expressed by Equation (8). When a vehicle exists, when a distance value is less than 3 m, the bitstream is set to 1. Otherwise, the bitstream has a value of 0. For example, referring to the image of FIG. 10, when a left-side vehicle is overtaking the traveling vehicle, a bitstream increases from [001] to [111] and then decreases from [111] to [100]. The vehicle recognizer 230 determines the traveling tendency of a side-vehicle through the consecutive increase and decrease of the bitstream.

$$b=[s_1 s_2 s_3], s_i \in [0, 1] \quad (8)$$

The vehicle recognizer 230 determines the traveling tendency of a vehicle in step 906, and performs vehicle detection in cooperation with a front/rear-recognizer. When a side-vehicle is overtaken, a vehicle of a corresponding lane is detected through a rear-vehicle recognition. In an opposite case, a vehicle is detected through a front-vehicle recognition. When a vehicle has disappeared and has not been seen from the front/rear of the traveling vehicle, a vehicle candidate is generated until the vehicle is detected on an assumption that the vehicle exists in blind spots. Further, when a vehicle detected by a front or rear-vehicle recognizer gradually disappears from right/left areas, a vehicle candidate is generated until the vehicle is detected by a side-vehicle recognizer because the vehicle exists in right/left short distance areas.

Figure 5:
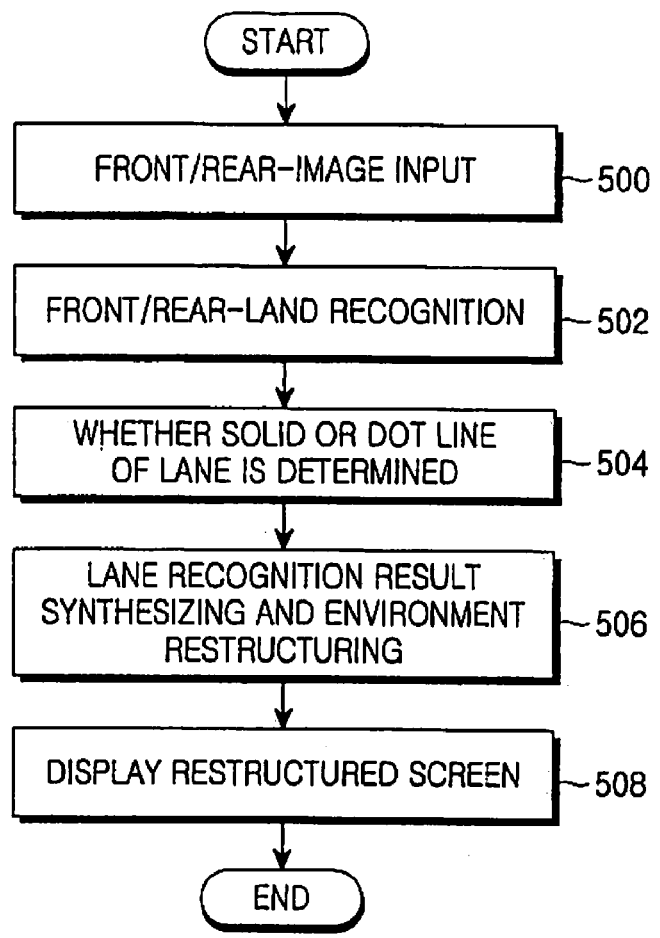
FIG. 5 is a flow diagram illustrating road restructuring through recognition of lanes in front/rear of a traveling vehicle according to the present invention.
Figure 6:
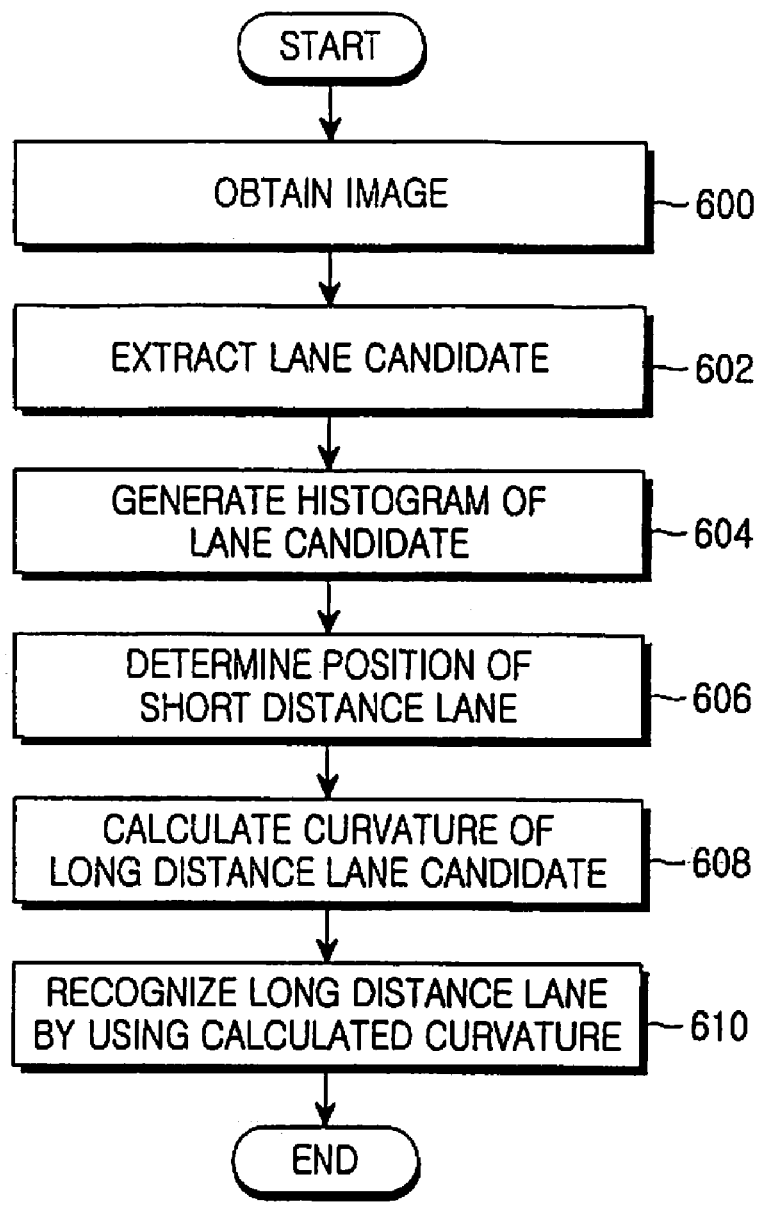
FIG. 6 is a flow diagram illustrating lane recognition according to the present invention.
Figure 11:
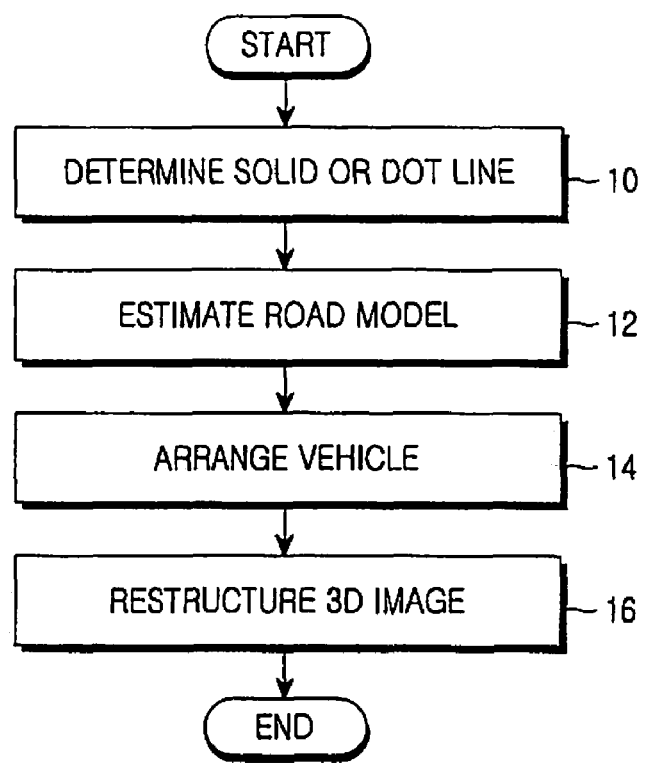
FIG. 11 is a flow diagram illustrating a process for generating driver assistance information of a traveling vehicle based on lane and vehicle recognition according to the present invention.
Figure 12A:
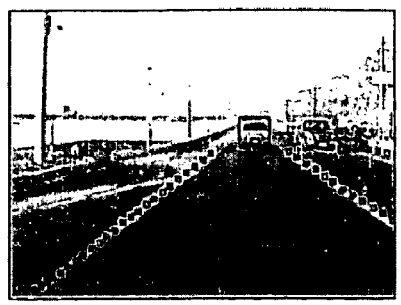
FIGS. 12A, 12B and 12C are screens illustrating driver assistance information of a traveling vehicle generated through lane and vehicle recognition according to the present invention.
Figure 12B:
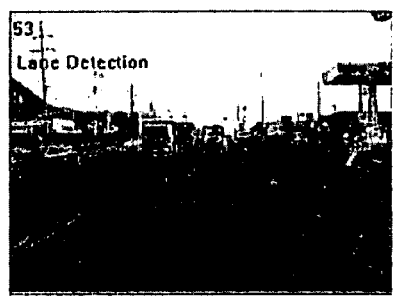
Figure 12C:
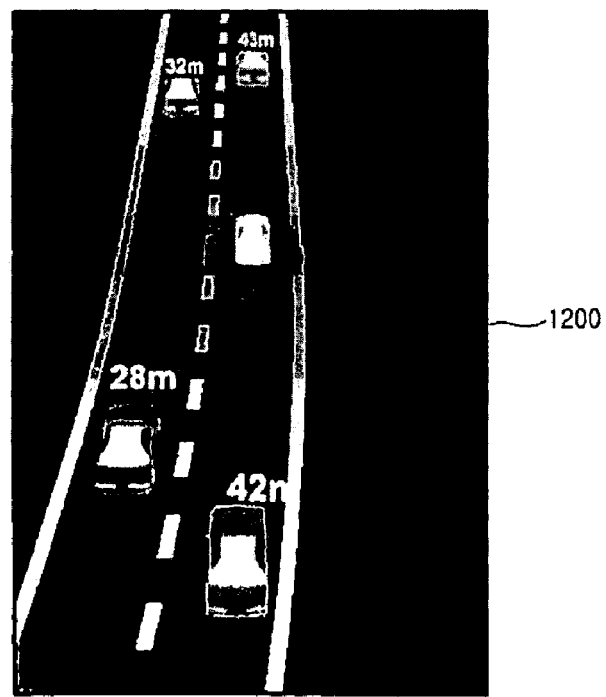

Referring to FIG. 11, in steps 10 and 12, the environment restructuring unit 220 determines whether a lane is a solid lane or a dot lane through a lane recognition process as shown in FIGS. 5 and 6, and estimates a road model. In order to arrange vehicles in a newly set road model in step 14, the environment restructuring unit 220 applies a position relation between a previous lane and a vehicle to a new road model, and arranges vehicles detected through the front/rear-vehicle detection process and the side-vehicle detection process, as shown in FIG. 9. In step 16, the environment restructuring unit 220 displays a longitudinal direction distance by using Open Graphics Language (OpenGL) for a front/rear-vehicle, and a lateral direction distance by using OpenGL for a right/left-vehicle. Further, the environment restructuring unit 220 differently expresses the color of a vehicle model in each lane, and restructures a 3D image in which a driver can easily adjust a field of vision. The arrangement example of the restructured road and vehicles may be as shown in FIGS. 12A-C. FIG. 12C shows an example of the road and vehicles restructured through the front-image of FIG. 12A and the rear-image of FIG. 12B in a situation in which a traveling vehicle is traveling in a two-lane one way.

Figure 13:
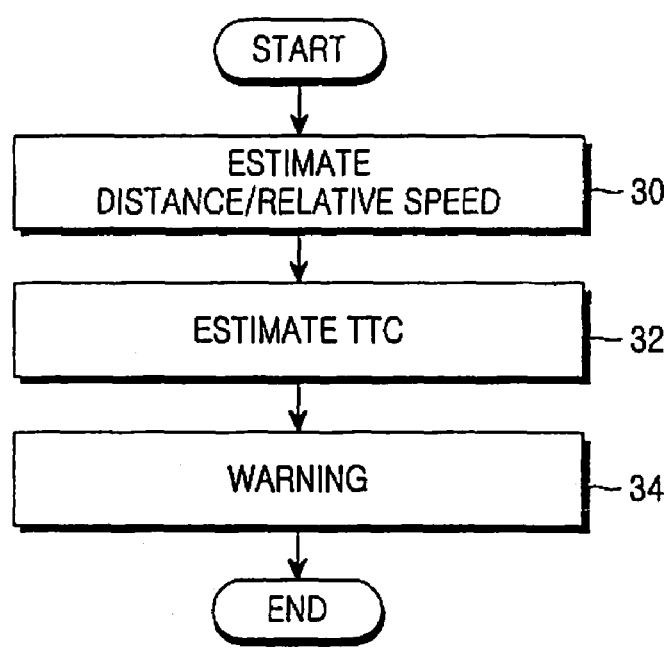
FIG. 13 is a flow diagram illustrating a process for collision warning according to the present invention.

While the driver assistance information of a traveling vehicle restructured through the lane and vehicle recognition processes as described above is displayed on a screen, it is also possible to inform a user of information about collision between a traveling vehicle and a detected vehicle. An operation for collision warning will now be described with reference to FIG. 13.

In the present invention, an inter-vehicle distance uses an average distance of five consecutive times in order to reduce an error of inverse-perspective transform. In step 30, the collision warning generator 240 estimates a relative speed by using a time difference among obtained images and a distance difference with a previous image. An inter-vehicle relative speed v may be computed from a difference between an inter-vehicle distance $d_{t-1}$ in a previous frame and an inter-vehicle distance $d_t$ in a current frame, and a time difference $\Delta t$ among obtained images, as expressed by Equation (9).

$$v = \frac{d_t - d_{t-1}}{\Delta t} \quad (9)$$

In step 32, the collision warning generator 240 estimates a TTC between a traveling vehicle and a detected vehicle from a current distance and a relative speed, as expressed by Equation (10).

$$TTC = -\frac{d_t}{v} \quad (10)$$

In step 34, the collision warning generator 240 warns a TTC for the traveling vehicle according to a warning area and a danger area in a particular manner. The warning area is set as an area in which a vehicle is traveling within a breaking distance. In the warning area, it is possible to set in advance the output of a voice message for attracting attention. The danger area is set as an area in which a vehicle is traveling within a TTC of a −2 to 0 sec, and it is possible to set the output of a consecutive warning sound.

As described above, the present invention can restructure traveling environments into a bird's eye image based on a sensor system capable of removing blind spots around a traveling vehicle, and a method capable of exactly detecting a lane and a vehicle, and give a collision warning when there is a possibility of collision. Accordingly, since a driver can easily become aware of information about blind spots, the driver can operate with reduced anxiety for blind spots, and can drive a vehicle conveniently and safely through detection of position and relative speed of an adjacent vehicle, and collision warning. Further, the present invention integrates recognition results of front/rear vehicles based on a lane recognition method applicable to various road environments including shape, curvature, loss of a lane, etc., improves stability of lane recognition, and distinguishes a solid line from a dot line, so it is possible to provide a driver with varying degrees of danger. In addition, when a vehicle deviates from a lane, a voice warning may be output and a position of the vehicle for a road is restructured as a bird's eye image, so it is possible to improve stability and convenience because a driver can become aware of the vehicle status at a glance.

Although preferred embodiments of the present invention have been described for illustrative purposes, those skilled in the art will appreciate that various modifications, additions and substitutions are possible, without departing from the scope and spirit of the present invention as disclosed in the accompanying claims, including the full scope of equivalents thereof.

What is claimed is:

1. An apparatus for generating driver assistance information of a traveling vehicle, the apparatus comprising:
    at least one image receiver installed on the traveling vehicle to photograph front/rear images, wherein the image receiver provides the photographed front/rear images;
    at least one ultrasonic signal receiver installed on the traveling vehicle, wherein the ultrasonic signal receiver emits ultrasonic signals, and computes distance information based on return time of the ultrasonic signals after being reflected from another vehicle;
    a lane recognizer for detecting a lane from the front/rear images, determining whether the detected lane is one of a solid line and a dot line, and synthesizing recognition results of vehicles to generate an image of a road;
    a vehicle recognizer for setting a road area as an area of interest by using the lane recognition results of the lane recognizer, detecting a vehicle by using an image and ultrasonic signals, detecting vehicles by using a distance obtained from the ultrasonic signals received from the ultrasonic signal receiver, determining a traveling tendency of a vehicle based on changes in the distance, and outputting a position of the vehicle in a vehicle coordinate system; and
    an environment restructuring unit for generating the driver assistance information by applying the vehicle detected by the vehicle recognizer to the image restructured by the lane recognizer.

2. The apparatus as claimed in claim 1, further comprising a display unit for displaying the driver assistance information generated by the environment restructuring unit.

3. The apparatus as claimed in claim 1, wherein, when a front/rear image is received from the image receiver, the lane recognizer extracts lane candidates according to changes in brightness of the image, generates a histogram of the extracted lane candidates, determines a position of a lane adjacent to the traveling vehicle, computes a curvature of the lane candidates located in a long distance, and recognizes a long distance lane by using the computed curvature, thereby detecting a vehicle from the front/rear image, where a long distance is a distance greater than a preset distance in order to determine long distance and short distance.

4. The apparatus as claimed in claim 3, wherein, when a curvature computed in a current image frame changes more than a threshold value as compared to a curvature computed in a previous frame in the recognition of the long distance lane through the computed curvature, a curvature increasing step-by-step from the current computed curvature in a set of lane curvatures is used instead of using the curvature computed in the current image frame.

5. The apparatus as claimed in claim 1, wherein the lane recognizer judges brightness for determining whether the lane is a solid line or a dot line by computing a Solid Rate value of a ratio of areas R and $L_i$, R denoting an area including a lane, and $L_i$ denoting a part in which the lane is actually drawn in the area R, the Solid Rate value being computed using $$SolidRate = \frac{\sum_{i}^{N} L_i}{R},$$

where the lane is a solid line when the Solid Rate value is greater than a threshold, and the lane is a dot line when the Solid Rate value is less than or equal to the threshold.

6. The apparatus as claimed in claim 1, wherein, the lane recognizer recognizes that another lane exists adjacent to a lane along which the traveling vehicle is traveling, and generates a solid line in said another lane when a lane to be used for restructuring of the image is a dot line.

7. A method for generating driver assistance information by a traveling vehicle, the traveling vehicle including at least one image receiver installed on the traveling vehicle to photograph front/rear images, the image receiver providing the photographed front/rear images, and at least one ultrasonic signal receiver installed on the traveling vehicle, the ultrasonic signal receiver emitting ultrasonic signals, and computing distance information based on return time of the ultrasonic signals after being reflected from another vehicle, the method comprising the steps of:

detecting a lane from the front/rear images;

determining whether the detected lane is one of a solid line and a dot line;

synthesizing recognition results of front/rear vehicles to generate an image of a road;

setting a road area as an area of interest by using the lane recognition results, and detecting a vehicle by using an image and ultrasonic signals;

detecting right/left vehicles by using a distance obtained from the ultrasonic signals received from the ultrasonic signal receiver, determining a traveling tendency of a vehicle based on changes in the distance, and outputting a position of the vehicle in a vehicle coordinate system; and generating the driver assistance information by applying the detected vehicle to a restructured image.

8. The method as claimed in claim 7, further comprising displaying the generated driver assistance information.

9. The method as claimed in claim 7, wherein the step of detecting the lane from the front/rear-images comprises:

extracting lane candidates according to changes in brightness of the image when the front or rear-image is received from the image receiver;

generating a histogram of the extracted lane candidates;

determining a position of a lane adjacent to the traveling vehicle, and computing a curvature of the lane candidates located in a long distance; and recognizing a long distance lane by using the computed curvature, where a long distance is a distance greater than a preset distance in order to determine long distance and short distance.

10. The method as claimed in claim 9, wherein, in the step of recognizing the long distance lane, when a curvature computed in a current image frame changes more than a threshold value as compared to a curvature computed in a previous frame in the recognition of the long distance lane through the computed curvature, a curvature increasing step-by-step from the current computed curvature in a set of lane curvatures is used instead of using the curvature computed in the current image frame.

11. The method as claimed in claim 7, wherein, in the step of determining whether the detected lane is a solid line or a dot line, brightness for determining whether the lane is a solid line or a dot line is judged by computing a Solid Rate value of a ratio of areas R and $L_i$, R denoting an area including a lane, and $L_i$ denoting a part in which the lane is actually drawn in the area R, the Solid Rate value being computed using $$SolidRate = \frac{\sum_{i}^{N} L_i}{R},$$

where the lane is a solid line when the Solid Rate value is greater than a threshold, and the lane is a dot line when the Solid Rate value is less than or equal to the threshold.

12. The method as claimed in claim 7, wherein, after the step of determining when the detected lane is one of a solid line and a dot line, recognizing that another lane exists adjacent to a lane along which the traveling vehicle is traveling, and generating a solid line in said another lane when a lane to be used for restructuring of the image is a dot line.

* * * * *